United States Patent Office 2,894,393
Patented July 14, 1959

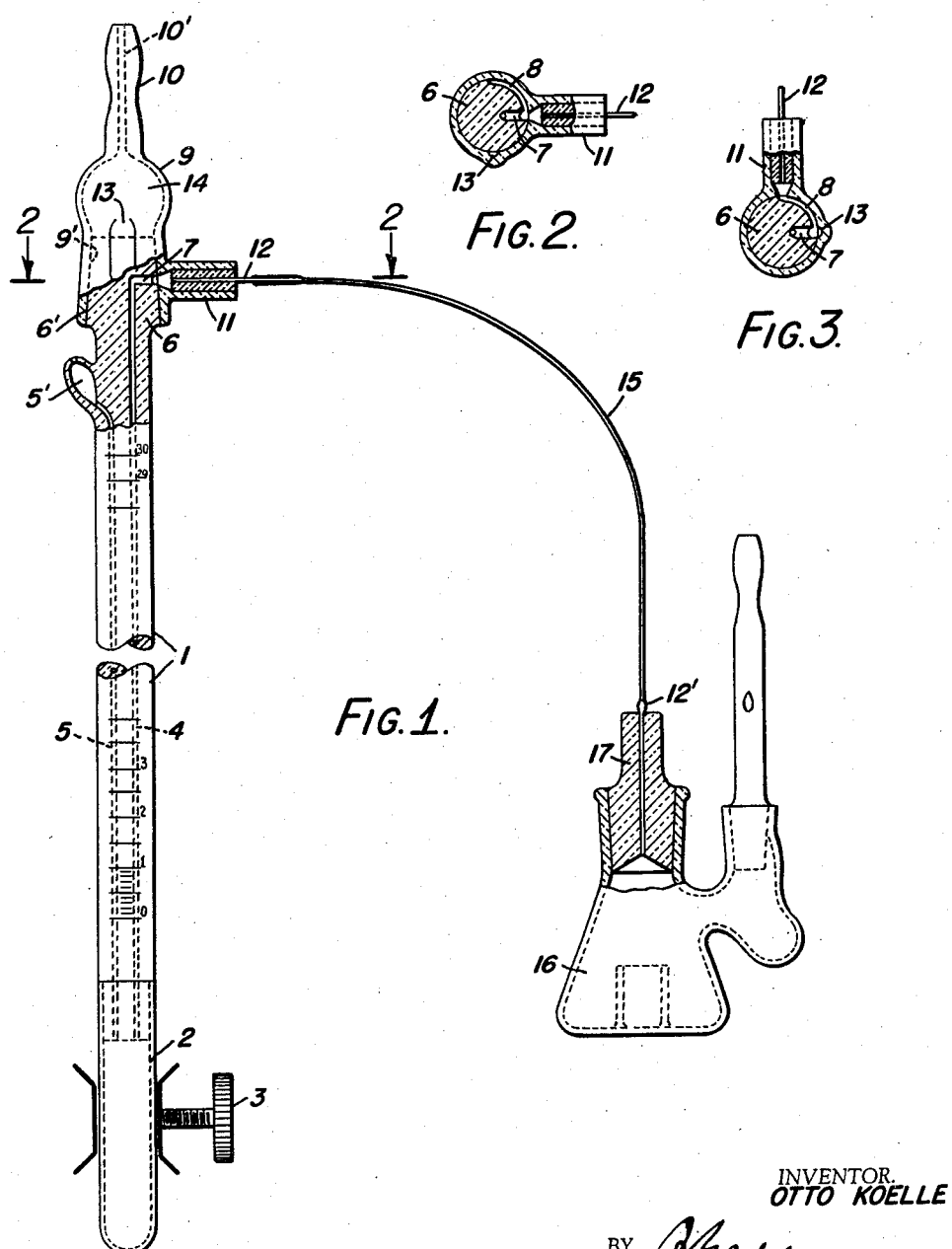

2,894,393

FLEXIBLE COUPLED MANOMETER

Otto Koelle, Melsungen, Germany, assignor, by mesne assignments, to Will Corporation, Rochester, N.Y., a corporation of New York Application November 20, 1956, Serial No. 623,403

Claims priority, application Germany November 26, 1955

6 Claims. (Cl. 73—401)

The present invention relates to apparatus for manometric measurements.

The procedure for determining gas development or gas absorption during a chemical or biochemical reaction by Warburg apparatus is well known. In this case, the reaction is permitted to take place in a closed reaction system in which the reaction vessel is connected through a conical, standard type ground glass joint to a manometer. Changes in the pressure of the gas in the closed reaction system, that are caused by gas evolution or absorption during the reaction, are directly proportional to changes in the quantity of gas in the closed system. Thus, changes in the manometer reading are directly proportional to the amount of gas evolved or consumed during the reaction under consideration.

The conventional Warburg apparatus for carrying out manometric measurements consists usually of a constant temperature bath and a shaking apparatus. The constant temperature bath serves to maintain the gas temperature in the reaction system constant in order to avoid the possibility that variations in temperature might cause additive changes in pressure which would give erroneous pressure readings.

The reaction vessel is ordinarily submerged in the constant temperature bath, and is joined to the manometer through glass tubing that includes the ground glass joint. The connecting tubing ordinarily is quite long since it must extend over the wall of the bath to connect with the manometer which is ordinarily mounted on a frame that holds the manometer outside of the bath. To assure good gaseous diffusion during the reaction, it is necessary to shake the reaction vessel during the experiment. Since the reaction vessel is connected to the manometer, the manometer will be shaken also as the reaction vessel is shaken in the bath.

Ordinarily, a large number of reaction vessels and their associated manometers are mounted on a single shaking device. Because of this, difficulty is experienced in reading each manometer accurately during the course of the reaction, and previous adjustment of the manometer is required. Especially when the frequency or amplitude of the shaking is great, an exact reading and adjustment of the manometer is impossible during the process; on the contrary it is necessary to stop the shaking device each time a reading is taken.

Unfortunately, there are serious disadvantages involved in stopping the shaking apparatus to take a reading, particularly when the amount of gas evolved or consumed during the reaction is large and where the reaction goes forward at a rapid rate since in stopping the shaking of a single manometer, all the other manometers of the apparatus, including those which are not being read directly, are stopped, and thus the reaction vessels which are connected to those other manometers are stopped with the result that the diffusion process in those other vessels may be impaired.

Since the usual Warburg apparatus always has a plurality of manometers, for example, fourteen, the stopping of the shaking apparatus for a reading time of only ten seconds, means the entire apparatus would be stopped for 140 seconds. If it is desired that readings be taken at intervals of 5 minutes during the course of the reaction, it can be seen that the reaction vessels would be agitated for only about half of the time of the experiment. Obviously, the errors thus introduced through disturbance of the diffusion process can be serious.

In the past, attempts have been made to eliminate this type of error by the construction of a special device that would make it possible at any time to stop that one manometer on which a reading was to be taken. In this way, the ratio of the stopping time to the shaking time obviously becomes more favorable. However, individual stopping of the manometers naturally means complication of the whole shaking device and a proportionately high expense for mechanical parts. Shaking devices for Warburg apparatus are generally sturdy and strongly built since with them the reaction vessels, the manometers, and the relatively heavy frame that supports the manometers must all be shaken at a single time. Obviously, the forces required to overcome inertia in such a shaking device are considerable and therefore a strong, and necessarily expensive, construction is required.

An object of the present invention is to provide an improved costruction for Warburg apparatus that will permit instantaneous reading of any manometer in the apparatus without interfering with the continuous agitation of the reaction vessels by the shaking device.

Another object of the invention is to provide a Warburg apparatus that is less expensive and simpler to construct than conventional apparatus, and that permits rapid and accurate reading of the manometers without interruption or interference with the agitation of the reaction vessels by the shaking device.

Still another object of the invention is to provide Warburg apparatus in which the manometers can be maintained in a stationary position at all times.

A further object of the invention is to provide a device for making manometric measurements, which permits the measurements to be made on stationary manometers, while the reaction vessels are being shaken.

Other objects of the inventon will be apparent from the description of a preferred embodiment of the invention which follows, and from the drawing.

As is shown in the embodiment of the invention illustrated in the drawing, the essence of the invention is in the use of a flexible capillary tube between the manometer and the reaction vessel. The use of a flexible capillary tube makes possible a considerable simplification of the reading procedure and permits a simpler structure for the apparatus. In the embodiment of the invention illustrated, the reaction vessel is interconnected with a double capillary manometer by a flexible capillary tube. The manometer consists of a single rod containing two capillaries that extend axially of the rod and that are spaced apart from each other. At the bottom of the rod, both capillaries open into a fluid reservoir. One axially-extending capillary is open at its upper end to the atmosphere. The second axially-extending capillary is connected at its upper end to the flexible tubing by a novel type of joint.

To provide this joint, the manometer rod is formed adjacent its upper end with a ground tapered peripheral portion that forms the male member of a conventional ground joint. A sleeve is engaged over this ground portion of the rod. It has an internal tapered surface that fits over the tapered surface of the rod in fluid-tight engagement. The sleeve is formed with a side arm that contains a radially-extending capillary passage that is connected with the flexible capillary tube. The manometer rod is formed with a radial capillary passage that interconnects the second of its two axial capillaries and an arcuate recess or channel that extends through an angle of approximately 90° around the ground portion of the manometer rod. Thus, the radial capillary passage in the side arm of the sleeve can be connected operatively with the second axially-extending capillary passage in the manometer rod at any angular position within a range of 90°.

The internal, tapered wall of the bore of the sleeve is formed with an axially-extending recess that is connected at its upper end to a nipple that is shaped to receive a hose connection. This recess is angularly spaced from the radial capillary duct in the side arm of the sleeve by an angular distance that is less than the angular extent of the arcuate channel in the ground tapered surface of the joint. Thus, the sleeve can be rotated so that the radial capillary passage through its side arm and its recess opens simultaneously into the arcuate channel on the manometer rod. In this way, at the proper angular position of the sleeve, the reaction vessel and the capillary of the manometer can be vented to the atmosphere if desired.

In the drawing:

Fig. 1 is a side elevation, partly broken away, showing apparatus constructed according to one embodiment of this invention for taking manometric measurements and consisting of a manometer and a reaction vessel connected by a flexible capillary tube;

Fig. 2 is a section taken on the line 2—2 of Fig. 1; and

Fig. 3 is a similar section but showing the sleeve rotated to a different position relative to the manometer rod.

There is thus provided a remarkably simple apparatus in which the manometer is held in a stationary position while the reaction vessel is shaken. The manometer consists of a double capillary rod 1, on the lower end of which is mounted a compressible rubber fluid sack or well 2 and a liquid level adjusting screw 3, of conventional type, by which the volume of rubber sack can be controlled to adjust the liquid level.

The two manometer capillaries 4 and 5 are open at the bottom to communicate with the rubber fluid sack or well 2. One capillary 5 is connected with the atmosphere through a pocket 5' that is formed in an enlarged laterally projecting portion of the manometer rod adjacent the upper end of the manometer rod. The pocket 5' serves to collect manometer fluid when there are large fluctations in pressure. The second capillary 4 is adapted to be connected with the reaction vessel.

The upper end 6 of the manometer rod is formed with a tapered peripheral surface 6' that forms the male member of a ground joint. A capillary hole 7 is bored radially of the rod from its tapered ground surface to communicate with the capillary 4. An arcuate groove or channel 8 is formed in the tapered surface 6', circumferentially of the manometer rod 1. This groove or channel extends over an angle of 90°. The bored hole 7 opens into this groove or channel at one end thereof.

A sleeve 9 is formed with a tapered internal surface 9' and is rotatably mounted over the upper end of the rod. It constitutes the female member of the ground joint. The upper end of this sleeve is shaped into a nipple 10.

The nipple 10 has a bore 10' and is shaped to receive a flexible hose connection for possible gassing operations, as described hereinafter. The sleeve 9 is also formed, with a side arm or tube 11 in which a metallic tube 12 is rigidly secured to provide a capillary passage through the sleeve 9 and side arm 11. The tube 12 may be cemented in place, or, if the manometer is constructed of glass, the tube 12 may be sealed in place by annealing the glass around the tube.

The sleeve 9 is also formed with an internal axial recess or groove 13 that opens at its upper end into the chamber 14 of the sleeve. The recess 13 is angularly spaced about 90° from the side arm 11.

The manometer is connected to a flexible capillary tube 15 which has a diameter of about 0.25 mm. One end of the flexible tube is pushed over the rigid capillary cannula or tube 12; and its other end is connected to a stopper 17, that may include another cannula or tube 12'. The stopper may be made of synthetic material, and may be conical. It engages in the neck of a reaction vessel 16 to close the reaction vessel.

The flexible capillary tube 15 may be made from a synthetic plastic material such as polyethylene and polyvinyl chloride. Sufficient stiffness must be provided to prevent crimping of the tube upon itself. Hollow metal wire may also be used for the capillary tubing. Naturally for this purpose, a metal, or an alloy must be used that will not corrode on contact with the manometer fluid and with the reaction fluid.

Fig. 2 shows the position of the sleeve 11 when the device is in operation. Here, the tube or cannula 12 is connected to the bored capillary hole 7; and thus the capillary 4 of the manometer rod 1 is operatively connected through the flexible tube 15 with the reaction vessel 16. The recess 13, in this position of the sleeve 9, is inoperative.

Fig. 3 shows the position of the sleeve 9 when, for the purpose of pressure equalization at the beginning of the experiment, the manometer and the reaction vessel are connected with atmosphere. The sleeve 9 has here been rotated from the position shown in Fig. 2 to a position in which the recess 13 is aligned with the groove 8; and both the capillary 4 of the manometer rod and the reaction vessel 16 are vented to the atmosphere through the chamber 14, and the bore 10' of the nipple 10.

There is thus provided a manometer that is not rigidly connected with the reaction vessel, and can, therefore, remain stationary during the entire time of experimentation, without being influenced by the shaking motion of the reaction vessels. Reading and adjustment of the manometer are therefore greatly simplified. The construction of the shaking mechanism can be designed to suit the reaction vessels only and can be correspondingly lighter and simpler in construction than formerly. Moreover, there is now no need to make any provision for stopping the manometers individually, since all of the manometers are stationary at all times.

An additional advantage of the apparatus constructed according to this invention is that the flexible capillary tubing contains a very small volume of gas. Therefore, any variations in volume caused by bending of the tubing are so insignificant that they need not be considered. Moreover, in view of the very small inner diameter of the flexible capillary tube, it is possible to precalibrate the volume of the manometers and reaction vessels by known methods.

Still another advantage of this novel design and construction is that the connection between each manometer and its reaction vessel can be held to a very small volume. This is made possible by the novel construction described above, which eliminates the conventional 3-way stopcock on the manometer, and the additional glass tubing usually associated therewith. Also, the flexible capillary tubing may have a much smaller diameter than the conventional glass capillary tubing.

In operation, the reaction vessels 16 are charged and then immersed in a constant temperature water bath and are mounted to be shaken during the experiment or test.

After a reaction vessel 16 has been properly charged, it is closed by its male stopper 17 and is connected to the associated manometer by associated flexible tubing 15. The reaction vessel and the manometer are then immersed in the bath and vented to the atmosphere through the vent 13, by proper orientation of the associated sleeve 9. While the manometer capillary 4 is thus vented, the liquid level of the manometer is adjusted to a desired height by the adjusting screw 3. The sleeve 9 is then rotated to align the tube or cannula 12 with the bored capillary hole 7, and to seal off the manometer capillary 4 and the reaction vessel 16 from atmosphere. Pressure changes thereafter occurring in the reaction vessel can be measured by a comparison of the liquid levels in the two capillaries 4 and 5 of the manometer rod. Ordinarily, several reaction vessels are mounted to be shaken simultaneously. Each has its own manometer connected to it. The several manometers are mounted on a stationary mounting board, adjacent the constant temperature bath but not in the bath. Because each reaction vessel and the manometer associated therewith are interconnected by a flexible tube, the shaking and agitation of the reaction vessels do not affect the manometers. Therefore, readings may be made of the liquid levels in the manometer as the reaction proceeds, at any desired time, without interfering with the course of the reaction or with the gaseous diffusion in any of the reaction vessels and without stopping the shaking of any of the reaction vessels 16. When the series of observations is completed, each reaction vessel and its associated manometer capillary 4 are again vented to the atmosphere by rotation of the sleeve 9 to effect operative connection of the reaction vessel and manometer capillary 4 with the vent channel 13.

In describing the illustrated embodiment of the invention, certain features of the invention have been described in order fully to disclose the invention, but it will be understood that many minor variations and constructions are possible that are within the skill of the art. Thus, for example, the manifold channel 8 may be angularly larger or smaller than the 90° channel illustrated and described above. Other similar modifications in structure will occur to those skilled in the art.

While the invention has been described in connection with a specific embodiment thereof, then, it will be understood that it is capable of further modifications, and this application is intended to cover any variations, uses, or adaptations of the invention, following, in general, the principles of the invention and including such departures from the present disclosure as come within the known or customary practice in the art to which the invention pertains and as may be applied to the essential features hereinbefore set forth and as fall within the limits of the appended claims.

Having thus described my invention what I claim is:

1. A manometer assembly comprising a rod having an axially-extending capillary duct therein, and having a portion of its outer surface at one end tapered to form the male member of a joint and having a radially-directed capillary passage interconnecting said axially-extending capillary with the periphery of said rod at said tapered portion thereof, a sleeve forming the female member of said joint and having a tapered internal surface rotatably mounted on said rod over said male tapered portion thereof in fluid-tight fashion, said sleeve having a capillary passage therethrough that opens at one end onto said tapered internal surface, one of said joint members having its tapered surface formed with an arcuate channel therein that opens into the capillary passage in said one joint member, the other of said members having its tapered surface formed with an axially-directed vent channel angularly spaced about the axis of said rod from the capillary passage of said other joint member, said arcuate channel extending about the axis of said rod through an angle not less than the angle between said axially directed vent channel and the capillary passage in said other member, whereby said axially directed vent channel opens at one end to the atmosphere and is adapted to register with the said arcuate channel at its other end in one position of rotary adjustment of said sleeve on said rod.

2. A manometer assembly comprising a rod having an axially-extending capillary duct therein, said rod at one end having a portion of its outer surface tapered to form the male member of a joint and having a radially-directed capillary passage interconnecting said axially-extending capillary with the periphery of the rod at said tapered portion thereof, said tapered surface being formed with an arcuate channel therein that extends about the axis of said rod and that opens into said radially-directed capillary passage, a sleeve forming the female member of said joint and having an internal tapered surface rotatably mounted on said rod over said male tapered portion thereof in fluid-tight fashion, said sleeve having a capillary passage therethrough that opens at its inner end onto its tapered internal surface, the tapered internal surface of said sleeve being formed with an axially-extending vent channel therein that is angularly spaced about the axis of said rod from the said capillary passage in said sleeve by an angle no greater than the angular extent of said arcuate channel, said vent channel opening at its upper end to atmosphere, said sleeve being rotatable to move the lower end of said vent channel into and out of register with said arcuate channel.

3. A capillary manometer comprising a manometer rod having a pair of axially-extending, spaced capillaries that are open at the lower end of said rod, a liquid well mounted at the lower end of said rod to supply liquid to said capillaries, said rod having a pocket adjacent to upper end thereof connecting a first of said capillaries with the atmosphere, a portion of the outer surface of said rod being tapered to form the male member of a joint, said rod having a radially-directed capillary passage connecting the second of said capillaries with the periphery of the rod at said tapered portion thereof, a sleeve forming the female member of said joint and having a tapered internal surface rotatably mounted on said rod over said male tapered portion thereof in fluid-tight fashion, said sleeve having a capillary passage therethrough that opens onto its tapered internal surface and that is registrable with the radial capillary passage in said rod in one position of rotation of said sleeve; one of said joint members having its tapered surface formed with an arcuate channel therein that opens into the said capillary passage therein, said arcuate channel extending about the axis of said rod, vent means formed in the other of said joint members and including a vent that opens at one end to the atmosphere and that is adapted to register with the said arcuate channel at its other end in another position of rotary adjustment of said sleeve, and means for connecting the passage in said sleeve to a gas chamber.

4. A capillary manometer comprising a manometer rod having a pair of axially-extending, spaced capillaries that are open at the lower end of said rod, a liquid well mounted at the lower end of said rod to supply liquid to said capillaries, said rod having a pocket adjacent the upper end thereof interconnecting a first of said capillaries with the atmosphere, a portion of the outer surface of said rod being tapered to form the male member of a joint, said rod having a radially-directed capillary passage connecting the second capillary with the periphery of said rod at said tapered portion thereof, a sleeve forming the female member of said joint and having a tapered internal surface rotatably mounted on said rod over said tapered portion thereof in fluid-tight fashion, said sleeve having a capillary passage therethrough that opens onto its tapered internal surface and that is registrable with the radial capillary passage in said rod upon rotation of said sleeve, the tapered surface of said rod being formed with an arcuate channel that extends about the axis of said rod and that opens into the said capillary passage in said rod, the tapered internal surface of said sleeve being formed with an axially-extending vent channel therein that communicates at one end with the atmosphere and whose other end is angularly spaced from the capillary passage in said sleeve by an angle no greater than the angular extent of said arcuate channel, whereby said other end of said vent channel upon rotary adjustment of said sleeve is registrable with said arcuate channel, and means mounted on said sleeve connecting the capillary passage therein to a gas chamber.

5. A capillary manometer comprising a manometer rod having a pair of axially-extending spaced capillaries that are open at the lower end of said rod, a liquid well mounted at the lower end of said rod to supply liquid to said capillaries, said rod having a pocket adjacent the upper end thereof interconnecting a first of said capillaries with the atmosphere, a portion of the outer surface of said rod being tapered to form the male member of a joint, said rod having a radially-directed capillary passage interconnecting said second capillary with the periphery of said rod at said tapered portion thereof, a sleeve forming the female member of said joint and having a tapered internal surface rotatably mounted on said rod over said tapered portion thereof in fluid-tight fashion, said sleeve having a capillary passage therethrough that opens onto its tapered internal surface and that is registrable with the radial capillary passage in said rod upon rotation of said sleeve, the tapered surface of said rod being formed with an arcuate channel therein that extends about the axis of said rod and that opens into the said capillary passage therein, the tapered internal surface of said sleeve being formed with an axially-extending vent channel therein that communicates at one end with the atmosphere and whose other end is angularly spaced about the axis of said rod from the capillary passage in said sleeve by an angle no greater than the angular extent of said arcuate channel said other end of said vent channel being disposed axially in a plane aligned with the plane of said arcuate channel, whereby said vent channel upon rotary adjustment of said female member is registrable at said other end thereof with said arcuate channel, said sleeve being formed with a nipple adapted to receive a hose connection, said vent channel extending through said nipple and opening to the atmosphere at the end of said nipple, said sleeve being formed with a radially-extending outwardy directed arm through which its capillary pasage extends for interconnection with a chamber containing confined gas.

6. A manometer assembly comprising a manometer rod, a sleeve, said rod having a lower end face and a pair of axially-extending, spaced ducts that open at their lower ends through said lower end face, a liquid-supplying well mounted contiguous with said end face in communication with the lower ends of said ducts, said rod being formed with a chamber intermediate its ends, said chamber communicating at its upper end with the atmosphere and at its lower end with a first one of said ducts to provide a fluid reservoir in said rod, said rod having a ground tapered male surface at its upper end above said chamber, said ground surface having at an intermediate portion thereof a recess that communicates with the second duct and that extends angularly about the axis of said rod in symmetry to a median plane at right angles to the axis of said rod, said sleeve having a ground tapered bore and being rotatably mounted on said rod with the male surface of said rod engaged in said bore in rotatable, fluid-tight engagement, said sleeve having a third duct therethrough that communicates at one end with the bore of said sleeve in the median plane of said recess and that is adapted to have its other end placed in communication with a source of fluid whose pressure is to be measured, said sleeve being formed with an axially-extending vent passage one end of which communicates with said bore in the median plane of said recess and the other end of which communicates with atmosphere, said vent passage being angularly spaced about the axis of said rod from said third duct by an angle that is no greater than the angular extent of said recess whereby said sleeve may be rotatably adjusted on said rod selectively to a first position to place said second and third ducts, and said vent passage in communication with said recess simultaneously, or to a second position in which said vent passage is out of communication with said second and third ducts but in which said second and third ducts communicate with each other through said recess.

References Cited in the file of this patent

UNITED STATES PATENTS

| 2,662,409 | Dwyer | Dec. 15, 1953 |
| 2,703,014 | Koelle | Mar. 1, 1955 |

FOREIGN PATENTS

| 311,610 | Italy | Oct. 5, 1933 |
| 684,865 | Great Britain | Dec. 24, 1952 |
| 703,927 | Great Britain | Feb. 10, 1954 |